US010130189B2

(12) United States Patent
Baldwin, Jr. et al.

(10) Patent No.: US 10,130,189 B2
(45) Date of Patent: Nov. 20, 2018

(54) LAMINATED TEXTILE MATERIALS THAT REDUCE FLAME PROPAGATION, ARTICLES INCORPORATING SAME, AND METHODS OF MAKING SAME

(75) Inventors: Alfred Frank Baldwin, Jr., Greensboro, NC (US); John H. Walton, Greensboro, NC (US); James Douglas Small, Jr., Greensboro, NC (US); Phil Harris, High Point, NC (US); Walter G. Jones, Greensboro, NC (US); Ladson Lawrence Fraser, Jr., High Point, NC (US)

(73) Assignee: Precision Fabrics Group, Inc., Greensboro, NC (US)

(*) Notice: Subject to any disclaimer, the term of this patent is extended or adjusted under 35 U.S.C. 154(b) by 1371 days.

(21) Appl. No.: 12/192,528

(22) Filed: Aug. 15, 2008

(65) Prior Publication Data
US 2009/0044341 A1 Feb. 19, 2009

Related U.S. Application Data

(60) Provisional application No. 60/955,886, filed on Aug. 15, 2007.

(51) Int. Cl.
*A47C 31/00* (2006.01)
*D06N 3/00* (2006.01)
*B32B 7/12* (2006.01)
*B32B 5/26* (2006.01)
*B32B 33/00* (2006.01)
*B29C 65/48* (2006.01)
*B29C 65/00* (2006.01)
*B29C 65/08* (2006.01)
*B29C 65/02* (2006.01)
*B32B 37/12* (2006.01)
*B32B 27/12* (2006.01)
*B32B 27/30* (2006.01)
*B29K 101/12* (2006.01)
*B29K 105/00* (2006.01)
*B29K 105/08* (2006.01)
(Continued)

(52) U.S. Cl.
CPC .............. *A47C 31/001* (2013.01); *B32B 5/26* (2013.01); *B32B 7/12* (2013.01); *B32B 27/12* (2013.01); *B32B 27/304* (2013.01); *B32B 33/00* (2013.01); *D06N 3/00* (2013.01); *B29C 65/02* (2013.01); *B29C 65/08* (2013.01); *B29C 65/48* (2013.01); *B29C 65/482* (2013.01); *B29C 65/486* (2013.01); *B29C 65/4815* (2013.01); *B29C 66/305* (2013.01); *B29C 66/45* (2013.01); *B29K 2101/12* (2013.01); *B29K 2105/0088* (2013.01); *B29K 2105/0809* (2013.01); *B29K 2105/0836* (2013.01); *B29K 2105/0845* (2013.01); *B29K 2105/0854* (2013.01); *B29K 2995/0016* (2013.01); *B29L 2009/00* (2013.01); *B29L 2031/58* (2013.01); *B29L 2031/751* (2013.01); *B32B 37/12* (2013.01); *B32B 2305/18* (2013.01); *B32B 2307/3065* (2013.01); *B32B 2451/00* (2013.01); *B32B 2479/00* (2013.01); *D06N 2209/067* (2013.01); *Y10T 156/10* (2015.01); *Y10T 442/2631* (2015.04); *Y10T 442/3472* (2015.04); *Y10T 442/3707* (2015.04); *Y10T 442/494* (2015.04)

(58) Field of Classification Search
CPC ..... A47C 21/06; A47C 27/002–27/008; A47C 27/12–27/125; A47C 31/001; A47C 31/105; A47C 27/15; A47C 27/122; B68G 5/00; D03D 2700/0144; D04H 3/00; D04H 3/02; D04H 3/11; B32B 27/12; B32B 37/04; B32B 37/12; B32B 37/1207; B32B 2037/1215; B32B 2037/1223; B32B 2250/20; B32B 2262/0253; B32B 2262/0276; B32B 2262/0284; B32B 5/26; B32B 37/00; B32B 37/0076; B32B 37/0038; B32B 7/12; B32B 2307/3065; B32B 2307/306; B32B 7/14; Y10S 428/92–428/921
USPC ....... 428/920, 921; 442/59, 136, 414; 5/483, 5/698, 954; 297/DIG. 5
See application file for complete search history.

(56) References Cited

U.S. PATENT DOCUMENTS 4,866,799 A * 9/1989 Glackin ............................ 5/698
5,624,738 A * 4/1997 Barbeau ............. A41D 31/0027
428/198

(Continued)

FOREIGN PATENT DOCUMENTS

JP 61047847 * 3/1986 ............. D03D 15/12

OTHER PUBLICATIONS

Horrocks; Flame-retardant Finishing of Textiles; Review of Progress in Coloration vol. 16, Issue 1, Jun. 1986.*

*Primary Examiner* — Jennifer A Steele
(74) *Attorney, Agent, or Firm* — Myers Bigel, P.A.

(57) ABSTRACT

A method of producing a flame resistant ticking includes laminating a flame resistant substrate to a decorative fabric, wherein the substrate is configured to release a chemical vapor that reduces the rate of propagation of a flame along the decorative fabric when the decorative fabric is exposed to flame. The substrate is laminated in direct contact with the inside surface of the decorative fabric. In some embodiments, the laminated ticking is configured to release less than 15 MJ of heat in the first ten minutes when exposed to a flame in accordance with the testing protocol set forth in 16 CFR 1633. Upholstered articles, such as mattresses, mattress foundations, and articles of furniture, may incorporate the flame resistant ticking layer.

23 Claims, No Drawings

(51) Int. Cl.
    *B29L 9/00*      (2006.01)
    *B29L 31/58*     (2006.01)
    *B29L 31/00*     (2006.01)

(56) References Cited

U.S. PATENT DOCUMENTS

| | | | |
|---|---|---|---|
| 5,659,911 A * | 8/1997 | Kirkbride et al. | 5/636 |
| 2004/0198125 A1* | 10/2004 | Mater et al. | 442/394 |
| 2004/0226100 A1* | 11/2004 | Small et al. | 5/698 |
| 2005/0097652 A1* | 5/2005 | Rock | A41D 31/0027 2/82 |
| 2006/0068675 A1* | 3/2006 | Handermann et al. | 442/415 |
| 2007/0094802 A1* | 5/2007 | Knoff | 5/691 |
| 2007/0256246 A1* | 11/2007 | Gladney et al. | 5/737 |
| 2007/0283493 A1* | 12/2007 | Link et al. | 5/483 |
| 2007/0298668 A1* | 12/2007 | DeFranks | 442/59 |

* cited by examiner

LAMINATED TEXTILE MATERIALS THAT REDUCE FLAME PROPAGATION, ARTICLES INCORPORATING SAME, AND METHODS OF MAKING SAME

RELATED APPLICATION

This application claims the benefit of and priority to U.S. Provisional Patent Application No. 60/955,886, filed Aug. 15, 2007, the disclosure of which is incorporated herein by reference as if set forth in its entirety.

FIELD OF THE INVENTION

The present invention relates generally to upholstered articles and, more particularly, to rendering upholstered articles fire resistant.

BACKGROUND

There is heightened awareness of fire prevention in homes and businesses in the United States. This awareness has led to the development of standards and legislation directed to reducing the risk of fires, particularly with respect to bedding and upholstered furniture. Conventional fire prevention techniques for bedding and upholstered furniture involve the topical application of flame retardant chemicals directly to an outer decorative layer of upholstery material.

However, recently passed legislation may render conventional fire protection techniques for bedding (particularly mattresses) inadequate. For example, the cigarette burn test for measuring flame resistance (developed by the Upholstered Furniture Action Council) has been deemed inadequate by the state of California and by the U.S. Consumer Product Safety Commission. For example, in January, 2005, California implemented regulatory legislation requiring mattresses to be flame resistant (California Technical Bulletin 603 of the State of California Department of Consumer Affairs, referred to as "TB-603"). Aggressive federal standards for flammability of mattresses set forth by the U.S. Consumer Product Safety Commission require flame resistant construction for all mattresses sold in the United States and are described in the Federal Register at 16 CFR 1633 (hereinafter "16 CFR 1633"), which is incorporated herein by reference in its entirety. The testing specified by 16 CFR 1633 exposes a mattress side and top and a side of a foundation to a gas burner flame. Following the exposure, the mattress and foundation are monitored for thirty minutes to measure heat generation rate and total heat generation.

The top and side panels of a mattress are typically composed of layers of material. For example, the outer layer may be a decorative fabric referred to as ticking or a ticking layer, and which may be a high quality knit or woven textile. Mattress ticking fabrics are generally of loose construction and have a soft, extensible handle. A coating on the back or a laminated fabric on the back may be necessary to provide dimensional stability and wear resistance.

The next layer is typically a cushioning layer (or layers), such as foam, batting, or other lofty, soft material (or combinations of various soft materials). The cushioning layer provides a plump, soft, feel and texture to the panel. The next layer is typically a backing fabric that supports the cushioning material and provides strength and dimensional stability to the panel. The backing layer may be optional if the second layer is strong enough and stable enough to support the structure. Additionally, some mattress or upholstery panels are flat and do not have significant 'plumping' or cushioning, but must still provide the insulation and flame resistance required by the new standards. The backing layer is conventionally a polyester or polypropylene nonwoven fabric, a knit, or a woven fabric. The layers of a mattress panel are typically assembled via stitch quilting. Conventionally, a flame and heat blocking component is added to the panel when the panel is designed to resist heat, fire, or ignition.

When mattresses and other upholstered articles having a ticking layer are exposed to fire, or to a test flame challenge, the first material to be exposed is the ticking layer. Ticking fabrics can be made to be flame resistant by finishing the ticking fabric with flame retardant chemicals, or by back-coating the ticking fabric with flame retardant chemicals. Unfortunately, conventional finishing and back coating techniques may cause unacceptable changes to the ticking fabric, such as stiffening, discoloration, fiber blend limitations, and may cause exposure of individuals to chemicals on the sleep surface. Moreover, these conventional finishing and back-coating techniques may have a high degree of variability, may give unreliable performance, and may increase manufacturing costs.

To prevent the ignition of the core of a mattress, the core of an article of upholstered furniture, or other upholstered article, a variety of flame resistant materials have been utilized. For example, fabrics made from graphite, carbon, para-aramid, or other flame and heat resistant fibers have been used. Batting composed of flame resistant fibers or fibers that char, such as silica modified rayon (or Visil), modacrylic, FR rayon, FR polyester, melamine, or other suitable fibers, may be produced such that high basis weights can provide flame resistance and insulation. Foams may be chemically treated with flame retardant or impregnated with graphite. Fabrics may also be treated with flame retardant and/or intumescent chemical compositions or impregnated with intumescent chemicals to provide flame blocking and insulative properties.

Conventional ticking burns rapidly and can generate more than 15 MJ of heat in the first 10 minutes when exposed to a flame challenge per 16 CFR 1633 testing. Even though a mattress core is protected with conventional barrier materials, the mattress can fail testing and present significant flammability risk because of the ticking layer, or flaws in the ticking layer. The tendency to propagate flame and spread fire over the ticking surface is detrimental to the performance of upholstery and ticking fabrics used in furniture and mattress construction.

SUMMARY

In view of the above discussion, flame resistant ticking that reduces flame propagation, and upholstered articles incorporating same, are provided. According to some embodiments of the present invention, a method of producing a flame resistant ticking includes laminating a flame resistant substrate (also referred to as a "backing fabric", "backing layer", or "backer") to a decorative fabric, wherein the substrate is configured to release a chemical vapor that reduces the rate of propagation of a flame along the decorative fabric when the decorative fabric is exposed to flame. The substrate is laminated in direct contact with the inside surface of the decorative fabric. In some embodiments, the laminated ticking is configured to release less than 15 MJ of heat in the first ten minutes when exposed to a flame in accordance with the testing protocol set forth in 16 CFR 1633.

The decorative fabric may be a woven or nonwoven material and may be laminated to the substrate in various ways including, but not limited to, thermal bonding, ultrasonic bonding, adhesive bonding, etc. The substrate may be a woven or nonwoven material and may include non thermoplastic material such as viscose, silicic acid modified viscose, wood pulp, cotton, jute, ramie, linen, paper, glass, lyocell, PPS, aramids, novoloid, carbon, melamine, wool, and blends thereof. In some embodiments, the substrate may be a film or may be paper.

In some embodiments, the substrate includes acid liberating flame retardants that are released when the ticking is exposed to heat or flame. In some embodiments, the substrate includes endothermic material that is released when the ticking is exposed to heat or flame and that is configured to cool a flame and reduce flame propagation.

In some embodiments, the substrate includes free radical liberating flame retardants that are released when the ticking is exposed to heat or flame and that are configured to emit halogen free radicals and hydrogen halides that can quench a flame on the ticking. In some embodiments, the substrate includes a water liberating compound that is released when the ticking is exposed to heat or flame and that cools the ticking and limits flame propagation.

In some embodiments, the substrate includes thermoplastic material that is configured to melt into the decorative fabric when the ticking is exposed to heat or flame.

Ticking, according to embodiments of the present invention, may be utilized in mattress panels, as well as in other upholstered articles. Ticking, according to embodiments of the present invention can prevent or reduce flame propagation after exposure to flame. By preventing or reducing flame propagation, the risk of flame movement into the core of a mattress or upholstered article is decreased.

According to some embodiments of the present invention, an upholstered article (e.g., mattress, mattress foundation, article of furniture etc.) includes a flame resistant ticking layer that releases less than 15 MJ of heat in the first ten minutes when exposed to a flame in accordance with the testing protocol set forth in 16 CFR 1633. The ticking layer includes a flame resistant substrate laminated in direct face-to-face contact with a decorative fabric. The substrate is configured to release a chemical vapor that reduces the rate of flame propagation along the decorative fabric when the decorative fabric is exposed to flame.

In some embodiments, the substrate includes acid liberating flame retardants selected from the group consisting of: expandable graphite, boric acid, zinc borate, ammonium phosphate, poly ammonium phosphate, phosphate esters, organo-phosphorous compounds, polyphosphazenes, phosphorous, ammonium sulfamate, ammonium bromide, and ammonium chloride. In some embodiments, the substrate includes free radical liberating flame retardants selected from the group consisting of: vinyl chloride, decabromo diphenyl oxide, pentabromo dipheny oxide, polyvinylidene chloride, and antimony/halogen mixtures. In some embodiments, the substrate includes a water liberating compound selected from the group consisting of hydrated alumina, borax decahydrate, and zinc borate. In some embodiments, the substrate comprises a non flammable gas liberating flame retardant selected from the group consisting of: calcium carbonate, melamine, and sodium bicarbonate.

DETAILED DESCRIPTION

The present invention now is described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "mattress", as used herein, is intended to include mattresses and mattress foundations (e.g., box springs, etc.), without limitation.

The term "mattress panel", as used herein, is intended to include panels for mattresses and panels for mattress foundations. Thus, the term "mattress panel" includes panels used to construct mattresses and panels used to construct mattress foundations.

The terms "ticking", "ticking layer", and "tick", as used herein, are interchangeable and refer to the decorative fabric used as an outer surface fabric for an upholstered article, including mattresses, mattress foundations, mattress sets, upholstered furniture, etc.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s). It will be understood that the spatially relative terms are intended to encompass different orientations of a layer or panel in use or operation. For example, if a layer or panel is inverted, elements described as "under" or "beneath" other elements or features would then be oriented "over" the other elements or features. Thus, the exemplary term "under" can encompass both an orientation of "over" and "under." A layer or panel may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

The "back side" of any mattress panel is defined as the side of the panel that faces the internal core of a mattress/mattress foundation. Accordingly, the "front side" of any mattress panel is the side of the panel that faces outwardly away from the internal core of a mattress/mattress foundation (i.e., the front side is the opposite side from the back side of a panel). A mattress panel front side is the side that will be impinged with a flame according to the various tests described herein and that will be exposed to flame/heat in an actual fire event. Which side of a mattress panel is the front side and which side is the back side would be understood by one skilled in the art of the present invention.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention.

Embodiments of the present invention provide ticking that may be used to help protect internal combustible mattress (and other upholstered articles) materials when exposed to external ignition sources such as open flames or smoldering cigarettes. Applicants have unexpectedly discovered that when a flame resistant substrate is laminated to the back side (inside surface) of a ticking layer the resulting composite has significantly improved resistance to flame propagation and spread. Ticking layers according to embodiments of the present invention can replace non-laminated ticking layers, laminated ticking layers having a non flame resistant backing layer, and coated ticking layers.

According to some embodiments of the present invention, lamination of a flame resistant substrate may be accomplished by adhesive bonding, thermal bonding, ultrasonic bonding, or other methods known to those skilled in the art. According to some embodiments of the present invention, lamination may include the used of a flame resistant adhesive material or a flame retardant containing adhesive material. Exemplary adhesive agents may include, but are not limited to water-based adhesives, solvent-based adhesives, hot melt adhesives, powder adhesives, web adhesives, and film adhesives.

Applicants have unexpectedly discovered that when a flame resistant substrate is in direct contact with a ticking, the composite laminated ticking has reduced flammability, flame propagation, and flame spread, thus preventing a flame from moving across the surface of the article and igniting material away from the initial challenge, as compared to conventional ticking layers (e.g., conventionally laminated ticking layers, coated ticking layers, unbacked ticking layers, etc.).

Flame resistant substrates, according to embodiments of the present invention undergo vapor phase activity when ticking laminated thereto is exposed to heat and flame, as described below. In addition, flame resistant substrates, according to embodiments of the present invention are excellent in preventing flame propagation, and can stop the movement of flame across a mattress or other upholstered article. Various chemicals may be utilized in a flame resistant substrate, according to embodiments of the present invention.

For example, in some embodiments, acid liberating flame retardants such as expandable graphite, boric acid, zinc borate, ammonium phosphate, poly ammonium phosphate, phosphate esters, organo-phosphorous compounds, polyphosphazenes, phosphorous, ammonium sulfamate, ammonium bromide, ammonium chloride, and the like, emit acid vapor that can quench a flame and degrade the fuel component of a ticking layer. In some embodiments, materials that are endothermic, such as ethanolammonium borate, urea, or hydrated alumina, or phase change materials, can cool a flame and reduce flame propagation. The endothermic nature can come from heat of reaction, heat of fusion, phase change, or liberation of bound water, In some embodiments, free radical liberating flame retardants such as vinyl chloride, decabromo diphenyl oxide, pentabromo dipheny oxide, polyvinylidene chloride, antimony/halogen mixtures, and the like can emit halogen free radicals, and hydrogen halides that can quench a flame above it. In some embodiments, water liberating compounds such as hydrated alumina, borax decahydrate, or zinc borate, can liberate water vapor that may cool a ticking fabric above and limit flame propagation. Additionally, the water liberated from combustion of materials can act to reduce flame propagation. In other embodiments, non flammable gas liberating flame retardants such as calcium carbonate, melamine, or sodium bicarbonate, may liberate gases that rob a flame of oxygen.

According to further embodiments of the present invention, a flame resistant backing substrate may include non thermoplastic materials, such as viscose, silicic acid modified viscose, wood pulp, cotton, jute, ramie, linen, paper, glass, lyocell, PPS, aramids, novoloid, carbon, melamine, wool, blends of these fibers, and the like. Thermoplastic materials including, but not limited to, polyester, nylon, copolyester, polypropylene, poly-vinyl chloride, acrylic and modacrylic fiber, may be used as a minor constituent of a blend.

Flame resistant substrates, according to embodiments of the present invention may be a textile, woven or knit, a nonwoven fabric, a film, or a paper or a composite material. Cellulose-containing materials may be desirable since these materials tend to char and are readily available.

Alternately, blends of high temperature fibers such as aramid, novoloid, melamine, glass, carbon, or silicic acid modified viscose, may be used.

According to some embodiments of the present invention, a thermoplastic material, such as polyvinyl chloride, may be positioned such that, when exposed to high temperature, it melts into a ticking fabric and provides a flame resistant function.

Multi-layer flame barriers in mattress panel construction are known; however, these multi-layer structures are intended to be an internal defense to the intrusion of flame and do not have any direct effect on the ticking. Many of these multi-layered structures are lofted to provide thermal resistance, or are composed of silicic acid modified viscose, glass, aramid, melamine, carbon, phenol formaldehyde and the like to stand up to a vigorous flame challenge. In contrast, embodiments of the present invention are not intended to function as a flame barrier, but to add flame resistance and to reduce flame propagation on the outside decorative surface when a mattress or upholstered article is challenged in flame testing or in a fire.

Decorative layers with fire resistant substrates, according to embodiments of the present invention, are not limited to use in mattress construction. Various types of upholstered articles may incorporate laminated ticking, according to embodiments of the present invention.

Mattresses utilizing ticking layers having flame resistant substrates laminated thereto, according to embodiments of the present invention have numerous advantages over conventional mattresses. For example, because embodiments of the present invention retard the surface spread of fire, a mattress can meet the initial 15 MJ limit of heat released in the first ten minutes of a flame test according to 16 CFR 1633. Furthermore, ticking layers according to embodiments of the present invention provide a uniform and stable first line of defense for flame spread across a mattress.

Flame resistant substrates can be designed to liberate flame retardant chemistry into the outside ticking layer, thereby preventing or retarding flame propagation. Moreover, the structure of a ticking layer having a laminated flame resistant substrate, according to embodiments of the present invention, can improve the dependability of mattress construction, because the risk that certain flame retardant materials can be left out is eliminated.

Other advantages of ticking layers according to embodiments of the present invention include the fact that a ticking layer cannot be thinned by stretching during construction. Furthermore, the laminated substrate can provide strength and stability to the ticking in everyday use. In addition, the use of chemical coatings on the decorative layer (e.g., the sleep surface of a mattress, etc.) can be eliminated.

Ticking layers according to embodiments of the present invention can be lighter in weight and lower in cost than conventional flame resistant ticking layers. Accordingly, lighter weight and lower cost ticking layers can reduce the fuel load and manufacturing costs of a mattress. Furthermore, fiber selection and construction are less critical in laminated ticking, according to embodiments of the present invention.

EXAMPLES

A series of experiments were carried out to evaluate the ability of embodiments of the present invention to accomplish the goal of reducing or eliminating the propagation of flame across the surface ticking of an upholstered article, a mattress, a mattress set, etc. The objectives of the experiment were as follows:
1. Show the effectiveness of the inventive backer to reduce or eliminate flame propagation.
2. Show the ineffectiveness of conventional/alternate backing systems used in the field.
3. Show the necessity of intimate contact between the backing fabric and the ticking fabric.
4. Show the need for a product that out-gasses a flame retardant material on exposure, versus a material that is simply flame proof.

To accomplish this, a laboratory test was developed that exposes a ticking to a flame challenge per 16-CFR-1633, with only a 3 second exposure time. This allows for ignition and observation of the flame propagation without the severe exposure of the full 16-CFR-1633 test for flame barrier.

Two standard mattress ticking fabrics were obtained as follows:
1. Style 2632; A 3.75 oz/sq. yd. woven sateen tick with a fiber blend of 60% polyester and 40% polypropylene, obtained as a loom state (unfinished) material.
2. Style 2639; A 3.66 oz/sq yd woven sateen tick with a fiber blend of 65% polyester and 35% polypropylene, obtained as a loom state material.

The ticking samples were then subjected to burn testing and a timing of their burn rates and propagation. The tickings were burned alone, backed with polymer, and backed with various fabrics. Both plain and flame retardant adhesives were used.

As illustrated by the experimental data shown below in Table 1, an effective way of controlling the flame propagation of mattress ticking is to bond a backing fabric in intimate contact with a ticking layer, wherein the backing fabric is configured to release a gas phase material on decomposition that can retard flammability and flame propagation.

TABLE 1

| Test item | Ticking | Adhesive | Backing description | Test results and comment |
|---|---|---|---|---|
| 1, laminated ticking to finished ticking backer | 2632 | Flame Retardant EVA | Spunlaced, 1.55 OSY fabric; 80% viscose, 20% polyester finished w/ phosphate FR | Self extinguishes in 20 seconds. |
| 2, laminated ticking to finished ticking backer. | 2639 | Flame Retardant EVA | As #1 | Self extinguishes in 17 seconds |
| 3, as #1 but the ticking backer is not laminated | 2632 | None | As #1 | Burned completely to edge in 75 seconds. Significant propagation with unlaminated sample |
| 4, as #2 but ticking backer is not laminated | 2639 | None | As #1 | Burned completely in 22 sec. Significant propagation with unlaminated sample |

TABLE 1-continued

| Test item | Ticking | Adhesive | Backing description | Test results and comment |
|---|---|---|---|---|
| 5, Ticking only | 2639 | None | No backer | Complete burn in 14 sec |
| 6, Ticking only | 2632 | None | No backer | Complete burn in 21 sec |
| 7, Ticking coated with acrylic polymer | 2639 | None | Backcoated with acrylic latex | Complete burn in 19 sec |
| 8, Ticking coated with EVA hot melt | 2632 | None | Backcoated with EVA hot melt at 0.5 OSY | Complete burn in 30 sec |
| 9, Ticking coated with FR hot melt | 2639 | None | Backcoated with Flame retardant hot melt at 0.5 OSY | Complete burn in 19 sec Addition of FR to back coating is ineffective |
| 10, Ticking coated with FR hot melt | 2632 | None | Backcoated with flame retardant hot melt at 0.5 OSY | Complete burn in 20 sec Addition of FR to back coating is ineffective |
| 11, Ticking laminated to spunbond polypropylene | 2639 | FR EVA hot melt | 0.4 oz/sq.yd spunbonded polypropylene | Complete burn at 36 seconds. |
| 12, Ticking laminated to spun glass nonwoven backer. | 2639 | 3M solvent based adhesive #77 | Spunbonded resinated fiberglass at 1 oz/sq.yd. | Complete burn at 26 seconds. Glass does not decompose and does not retard combustion or propagation. |

The foregoing is illustrative of the present invention and is not to be construed as limiting thereof. Although a few exemplary embodiments of this invention have been described and several examples provided, those skilled in the art will readily appreciate that many modifications are possible in the exemplary embodiments without materially departing from the novel teachings and advantages of this invention.

That which is claimed is:

1. A flame resistant ticking laminate for use as a mattress or upholstered article panel, comprising an outer woven or knit ticking fabric laminated in face-to-face contact with a nonwoven or woven inner substrate, wherein the nonwoven or woven inner substrate comprises non thermoplastic fibers treated with a flame retardant, and wherein the nonwoven or woven inner substrate releases a chemical vapor when the outer woven or knit ticking fabric is exposed to a flame in accordance with testing protocol set forth in 16-CFR-1633, and the face-to-face contact between the nonwoven or woven inner substrate and the outer woven or knit ticking fabric allows for the chemical vapor to be released such that the chemical vapor reduces the rate of flame propagation along a surface of the outer woven or knit ticking fabric when tested in accordance with testing protocol set forth in 16-CFR-1633.

2. The flame resistant ticking laminate of claim 1, wherein the outer woven or knit ticking fabric and the nonwoven or woven inner substrate are laminated together using an adhesive, adhesive web, binder fiber, binder powder or adhesive agent such that the outer woven or knit ticking fabric and the nonwoven or woven inner substrate are laminated in face-to-face contact.

3. The flame resistant ticking laminate of claim 1, wherein the outer woven or knit ticking fabric and the nonwoven or woven inner substrate are laminated together using thermal or ultrasonic bonding.

4. The flame resistant ticking laminate of claim 1, wherein the nonwoven or woven inner substrate comprises acid liberating flame retardants selected from the group consisting of: expandable graphite, boric acid, zinc borate, ammonium phosphate, poly ammonium phosphate, phosphate esters, organo-phosphorous compounds, polyphosphazenes, phosphorous, ammonium sulfamate, ammonium bromide, and ammonium chloride.

5. The flame resistant ticking laminate of claim 1, wherein the nonwoven or woven inner substrate comprises a flame retardant which is an endothermic material.

6. The flame resistant ticking laminate of claim 5, wherein the endothermic material comprises ethanolammonium borate, urea, and/or hydrated alumina.

7. The flame resistant ticking laminate of claim 1, wherein the nonwoven or woven inner substrate comprises a free radical liberating flame retardant selected from the group consisting of: vinyl chloride, decabromo diphenyl oxide, pentabromo dipheny oxide, polyvinylidene chloride, and antimony/halogen mixtures.

8. The flame resistant ticking laminate of claim 1, wherein the nonwoven or woven inner substrate comprises a flame retardant comprising a water liberating compound selected from the group consisting of hydrated alumina, borax decahydrate, and zinc borate.

9. The flame resistant ticking laminate of claim 1, wherein the nonwoven or woven inner substrate comprises a flame retardant comprising a non flammable gas liberating flame retardant selected from the group consisting of: calcium carbonate, urea, and sodium bicarbonate.

10. The flame resistant ticking laminate of claim 1, wherein the non thermoplastic fibers are selected from the group consisting of: viscose, silicic acid modified viscose, wood pulp, cotton, jute, ramie, linen, paper, glass, lyocell, aramids, novoloid, carbon, wool, and blends thereof.

11. A mattress, mattress foundation, or article of furniture comprising the flame resistant ticking laminate of claim 1.

12. A method of producing a flame resistant ticking laminate for use as a mattress or upholstered article panel, comprising laminating a nonwoven or woven flame resistant inner substrate comprising non thermoplastic fibers in face-to-face contact with an outer woven or knit ticking fabric, wherein the nonwoven or woven flame resistant inner substrate comprises one of the following: acid liberating flame retardants, free radical liberating flame retardants, a water liberating compound, or a non flammable gas liberating flame retardant, wherein the nonwoven or woven flame resistant inner substrate releases a chemical vapor when the outer woven or knit ticking fabric is exposed to a flame in accordance with testing protocol set forth in 16-CFR-1633, and the contact between the nonwoven or woven flame resistant inner substrate and the outer woven or knit ticking fabric allows for the chemical vapor to be released such that the chemical vapor reduces the rate of propagation of a flame along a surface of the outer woven or knit ticking fabric when tested in accordance with testing protocol set forth in 16-CFR-1633.

13. The method of claim 12, wherein the outer woven or knit ticking fabric and the nonwoven or woven flame resistant inner substrate are laminated together using an adhesive, adhesive web, binder fiber, binder powder or adhesive agent.

14. The method of claim 12, wherein the outer woven or knit ticking fabric and the nonwoven or woven flame resistant inner substrate are laminated together using thermal or ultrasonic bonding.

15. The method of claim 12, wherein the acid liberating flame retardants are selected from the group consisting of: expandable graphite, boric acid, zinc borate, ammonium phosphate, poly ammonium phosphate, phosphate esters, organo-phosphorous compounds, polyphosphazenes, phosphorous, ammonium sulfamate, ammonium bromide, and ammonium chloride.

16. The method of claim 12, wherein the nonwoven or woven flame resistant inner substrate comprises an endothermic material selected from the group consisting of ethanolammonium borate, urea, and/or hydrated alumina.

17. The method of claim 12, wherein the free radical liberating flame retardants are selected from the group consisting of: vinyl chloride, decabromo diphenyl oxide, pentabromo dipheny oxide, polyvinylidene chloride, and antimony/halogen mixtures.

18. The method of claim 12, wherein the water liberating compound is selected from the group consisting of hydrated alumina, borax decahydrate, and zinc borate.

19. The method of claim 12, wherein the non flammable gas liberating flame retardant is selected from the group consisting of: calcium carbonate, wool, and sodium bicarbonate.

20. The method of claim 12, wherein the non thermoplastic fibers are selected from the group consisting of: viscose, silicic acid modified viscose, wood pulp, cotton, jute, ramie, linen, paper, glass, lyocell, aramids, novoloid, carbon, wool, and blends thereof.

21. The flame resistant ticking laminate of claim 1, wherein the outer woven or knit ticking fabric is not finished or coated with flame retardant chemicals.

22. The method of claim 12, wherein the outer woven or knit ticking fabric is not finished or coated with flame retardant chemicals.

23. The mattress, mattress foundation, or article of furniture of claim 11, wherein the flame resistant ticking laminate releases less than 15 MJ of heat in the first ten minutes when exposed to a flame in accordance with the testing protocol set forth in 16 CFR 1633.

\* \* \* \* \*